(12) United States Patent
Ukai et al.

(10) Patent No.: US 8,926,150 B2
(45) Date of Patent: Jan. 6, 2015

(54) LIGHTING DEVICE FOR VEHICLE

(75) Inventors: Yasuhiro Ukai, Aichi-ken (JP);
Hiroyasu Tahara, Aichi-ken (JP);
Takahiro Sugioka, Aichi-ken (JP);
Ryuuji Fukui, Aichi-ken (JP)

(73) Assignees: Toyota Boshoku Kabushiki Kaisha,
Aichi-Ken (JP); Toyota Shatai Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/988,589

(22) PCT Filed: Sep. 4, 2012

(86) PCT No.: PCT/JP2012/072425
§ 371 (c)(1),
(2), (4) Date: May 21, 2013

(87) PCT Pub. No.: WO2013/054611
PCT Pub. Date: Apr. 18, 2013

(65) Prior Publication Data
US 2013/0235604 A1 Sep. 12, 2013

(30) Foreign Application Priority Data

Oct. 13, 2011 (JP) ................. 2011-225767

(51) Int. Cl.
*B60Q 1/00* (2006.01)
*B60Q 1/26* (2006.01)
*B60R 13/02* (2006.01)
*B60Q 3/02* (2006.01)
*B60Q 3/00* (2006.01)
*F21V 8/00* (2006.01)
*F21S 8/10* (2006.01)

(52) U.S. Cl.
CPC .......... *G02B 6/0011* (2013.01); *B60R 13/0243* (2013.01); *B60Q 3/0233* (2013.01); *B60R 13/0206* (2013.01); *B60Q 3/0216* (2013.01); *B60Q 3/004* (2013.01); *F21S 48/00* (2013.01)
USPC ............ 362/488; 362/551; 362/501; 362/511

(58) Field of Classification Search
USPC ................... 362/511, 501, 488, 551
See application file for complete search history.

(56) References Cited

U.S. PATENT DOCUMENTS 6,550,946 B2 * 4/2003 Misawa et al. ................. 362/501
7,938,566 B2 * 5/2011 Ishida et al. ................... 362/488

(Continued)

FOREIGN PATENT DOCUMENTS

CN 101503078 8/2009
CN 102076523 5/2011

(Continued)

OTHER PUBLICATIONS

International Search Report, PCT/JP2012/072425, Nov. 20, 2012.

(Continued)

*Primary Examiner* — Thomas Sember
*Assistant Examiner* — Tsion Tumebo
(74) *Attorney, Agent, or Firm* — Greenblum & Bernstein, P.L.C.

(57) ABSTRACT

A lighting device includes a light source, an elongated panel member, an elongated light guide member provided to the panel member, a first light transmission portion provided in the panel member and through which the light from the light guide member transmits toward the first portion to be illuminated, and a second light transmission portion provided in the panel member to be farther away from the light source than the first light transmission portion and through which the light from the light guide member transmits toward the second portion to be illuminated, the second light transmission portion and the second portion extending along a longitudinal direction of the light exit portion. The light guide member and the second portion are provided to be closer to each other as they are farther away from the light source.

11 Claims, 6 Drawing Sheets

(56) References Cited

U.S. PATENT DOCUMENTS

| | | | |
|---|---|---|---|
| 8,356,921 B2* | 1/2013 | Fujita | 362/501 |
| 8,403,551 B2* | 3/2013 | Kino et al. | 362/609 |
| 2011/0141760 A1* | 6/2011 | Ory et al. | 362/555 |
| 2011/0170304 A1 | 7/2011 | Fujita | |
| 2013/0094233 A1 | 4/2013 | Ukai et al. | |

FOREIGN PATENT DOCUMENTS

| | | |
|---|---|---|
| JP | 2010-070116 | 4/2010 |
| JP | 2010-137793 | 6/2010 |
| JP | 2011-240811 | 12/2011 |

OTHER PUBLICATIONS

U.S. Appl. No. 13/988,633 to Yasuhiro Ukai et al., filed May 21, 2013.

Chinese Office action dated Feb. 8, 2014, along with an English-language translation thereof.

Chinese Official Action dated Sep. 19, 2014, along with English-language translation thereof.

* cited by examiner

LIGHTING DEVICE FOR VEHICLE

TECHNICAL FIELD

The present disclosure relates to a lighting device for a vehicle.

BACKGROUND ART

A lighting device for a vehicle that illuminates utility parts mounted to a vehicular interior part is known (for example, as described in Patent Document 1). A lighting device for a vehicle described in Patent Document 1 includes a light source, and an elongated light guide member that guides light from the light source. The light guide member extends along a switch base and also extends along an inner handle (an inside handle). With this configuration, the light exiting from the light guide member illuminates the switch base and the inner handle. With such a light guide member, two portions can be illuminated by one light source.

[Patent Document 1] Japanese Unexamined Patent Publication No. 2010-70116

Problem to be Solved by the Invention

However, in the configuration including the light source and the light guide member, light exiting from the light guide member becomes darker (brightness of the light is lowered) as is farther away from the light source. Therefore, the light exiting from a portion of the light guide member that is far from the light source is darker than the light exiting from a portion of the light guide member that is close to the light source. With this configuration, the light exiting from the portion of the light guide member far from the light source cannot be brighter than the light exiting from the portion of the light guide member close to the light source. Accordingly, in the configuration including the light source and the light guide member, illumination effects obtained in the lighting device for a vehicle are limited and this may deteriorate a design of the device.

To illuminate two different portions of the vehicular interior part, it has been known that a light source is arranged in each of two positions or a light guide member that is branched into two is used. In such configurations, brightness of the light illuminating each of the two portions of the vehicular interior part can be adjusted. However, this increases the number of light sources and complicates the configuration of the light guide member.

DISCLOSURE OF THE PRESENT INVENTION

The present invention has been made in view of the aforementioned circumstances. An objective of the present invention is to provide a lighting device for a vehicle that improves its design.

Means for Solving the Problem

A technology described herein relates to a lighting device for a vehicle provided to a vehicular interior part to illuminate a first portion and a second portion of the vehicular interior part that are to be illuminated. The lighting device includes a light source, a panel member formed in an elongated shape and configuring a part of the vehicular interior part, a light guide member formed in an elongated shape and provided to the panel member and including a light entrance portion and a light exit portion. Light from the light source enters the light entrance portion. The light exit portion extends in a longitudinal direction of the panel member and the light entering the light entrance portion exits from the light exit portion. The lighting device further includes a first light transmission portion provided in the panel member and through which the light exiting from the light exit portion transmits toward the first portion to be illuminated, and a second light transmission portion provided in the panel member to be farther away from the light source than the first light transmission portion and through which the light exiting from the light exit portion transmits toward the second portion to be illuminated. The second light transmission portion and the second portion extend along a longitudinal direction of the light exit portion. The light guide member and the second portion are closer to each other as they are farther away from the light source.

According to the present technology, light from the light guide member illuminates the first portion and the second portion to be illuminated. The light guide member and the second portion are arranged to become closer to each other in the compartment inner-outer direction as they are farther away from the light source. Therefore, a portion of the second portion that is far from the light source can be illuminated by brighter light than a portion of the second portion that is close to the light source. According to the present technology, with a configuration including only one light source, the first portion that is close to the light source and the second portion that is far from the light source are illuminated by bright light. Namely, the configuration of the present technology can provide same effects as the configuration in which a light source is arranged to correspond to each of the first portion and a apportion of the second portion that is far away from the light source (the configuration including two light sources). Accordingly, a design of a lighting device for a vehicle is improved with a simple configuration.

In the above configuration, the panel member may have a projected wall portion projecting to a vehicular compartment inner side, and the projected wall portion may extend along the longitudinal direction of the light guide member and may be projected such that a projected end is inclined toward a vehicular compartment outer side as is farther away from the light source. The light guide member may be provided on a vehicular compartment outer side of the projected wall portion, and the light guide member may extend along an extending direction of the projected wall portion so as to be closer to the vehicular compartment outer side as is farther away from the light source.

In the present technology, the light guide member may be curved and inclined toward the compartment outer side and to be closer to the second portion to be illuminated as is farther away from the light source. Accordingly, the light guide member and the second portion become closer to each other in the compartment outer-inner direction as they are farther away from the light source. The projected wall portion extends to be projected such that the projected end is inclined toward the compartment outer side as is farther away from the light source, and therefore, if the light guide member is arranged along the extending direction (a curved shape), the light guide member is easily curved.

The second portion may be provided on a lower side of the light guide member and may be an inclined surface that is inclined to be closer to be closer to the compartment inner side as is closer to a lower side. The inclined surface of the second portion may be inclined at an inclination angle with respect to a horizontal direction, and the inclination angle may decrease as is farther away from the light source.

According to the present technology, the inclination angle of the second portion with respect to the horizontal direction decreases as is farther away from the light source. In the present technology, the second portion is the inclined surface that is inclined to be closer to the compartment inner side as is closer to a lower side. With such a configuration, as the inclination angle with respect to the horizontal direction is smaller (close to be horizontal), the light exiting from the light guide member reflects off the second portion toward the compartment inner side is likely to be directed upward. Therefore, if passenger's eyes are located on an upper side from the second portion, the light reflecting off the portion of the second portion that is far from the light source (having a smaller inclination angle with respect to the horizontal direction) is likely to reach the passenger's eyes. Accordingly, the passenger can see the portion of the surface far from the LED 61 with higher brightness. As a result, a passenger can see a portion of the second portion that is far from the light source with bright light.

The second portion to be illuminated may be provided on a lower side of the light guide member and may be an inclined surface that is inclined to be closer to the compartment inner side as is closer to a lower side. The second portion may have an upper edge that is at a constant height along the extending direction of the second portion. The second portion may have a lower end edge that is sloped to be closer to the light guide member as is farther away from the light source.

According to the present technology, the upper edge of the second portion is provided at the constant height along the extending direction of the second portion, and the lower edge of the second portion is sloped to be closer to the light guide member as is farther away from the light source. Namely, the second portion is formed such that an upper-lower direction length decreases as is farther fro the light source. With this configuration, the passenger can see the portion of the second portion far from the light source (having a smaller length in the upper-lower direction) with brighter light than the portion of the second portion close to the light source (having a greater length in the upper-lower direction). The portion of the second portion that is far from the light source can be illuminated by brighter light.

Advantageous Effect of the Invention

The present technology provides a lighting device that improves its design.

MODES FOR CARRYING OUT THE INVENTION

Figure 1:
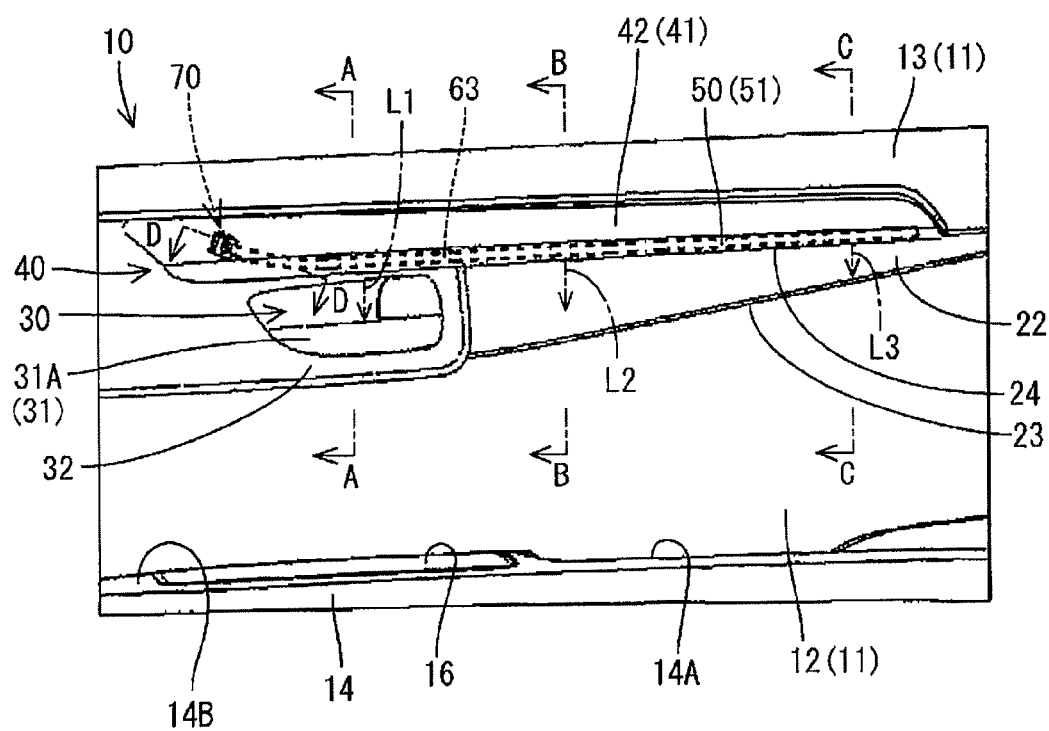
FIG. 1 is a front view of a main portion of a vehicular door trim to which a lighting device for a vehicle according to one embodiment of the present technology is mounted.

One embodiment of the present technology will be explained with reference to FIGS. 1 to 6. FIG. 1 is a front view of a main portion of a vehicular door trim 10 (a vehicular interior part) to which a lighting device for a vehicle 40 according to the present embodiment is mounted. The door trim 10 is an interior part that is mounted on a compartment inner side of an inner panel (not illustrated), and the vehicular door trim 10 and the inner panel configure a vehicular door.

The door trim 10 improves visual quality and comfort of a vehicle compartment. The door trim 10 includes a trim board 11. As illustrated in FIG. 1, the trim board 11 includes at least a main body 12 and an upper board 13 that is provided on an upper side of the main body 12. The trim board 11 is not necessarily configured by separate parts including the main body 12 and the upper board 13 but may be configured by one part that is integrally formed.

The main body 12 and the upper board 13 are connected to each other in a following method, for example. A mounting boss (not illustrated) is provided on one of the main body 12 and the upper board 13 and a mounting hole (not illustrated) is formed in another one of them, and the mounting boss is inserted to the mounting hole. Then, a distal end portion of the mounting boss is welded by welding means such as welding by ultrasonic waves. The main body 12 and the upper board 13 may be connected to each other by various connecting methods using screws or projection fitting.

The trim board 11 is formed from a synthetic resin such as polypropylene or a material obtained by mixing a synthetic resin and natural fibers (such as kenaf fibers). A skin 15 (see FIG. 3) is adhered to a part or an entire area of a vehicle compartment inner side of the trim board 11.

As illustrated in FIG. 1, the main body 12 includes an armrest 14 that is used as an armrest for a passenger. The armrest 14 is projected to a vehicular compartment inner side. An upper surface 14B of the armrest 14 extends along a horizontal direction. An opening 14A is formed on the upper surface 14B of the armrest 14 so as to be open upwardly. The opening 14A is used as a pull handle (not illustrated). A passenger puts his/her fingers in the pull handle to open and close the vehicular door.

An handle housing portion 30 is provided adjacent to a connection portion of the upper board 13 that is connected to the main body 12. An inside handle 31 (a holding portion 31A of the inside handle 31) is housed in the handle housing portion 30. The inside handle 31 is operated to open and close the vehicular door. A switch base 16 having a switch operation portion (not illustrated) is provided on a portion of the upper surface 14B of the armrest 14 that is located on a lower side of the handle housing portion 30.

Figure 3:
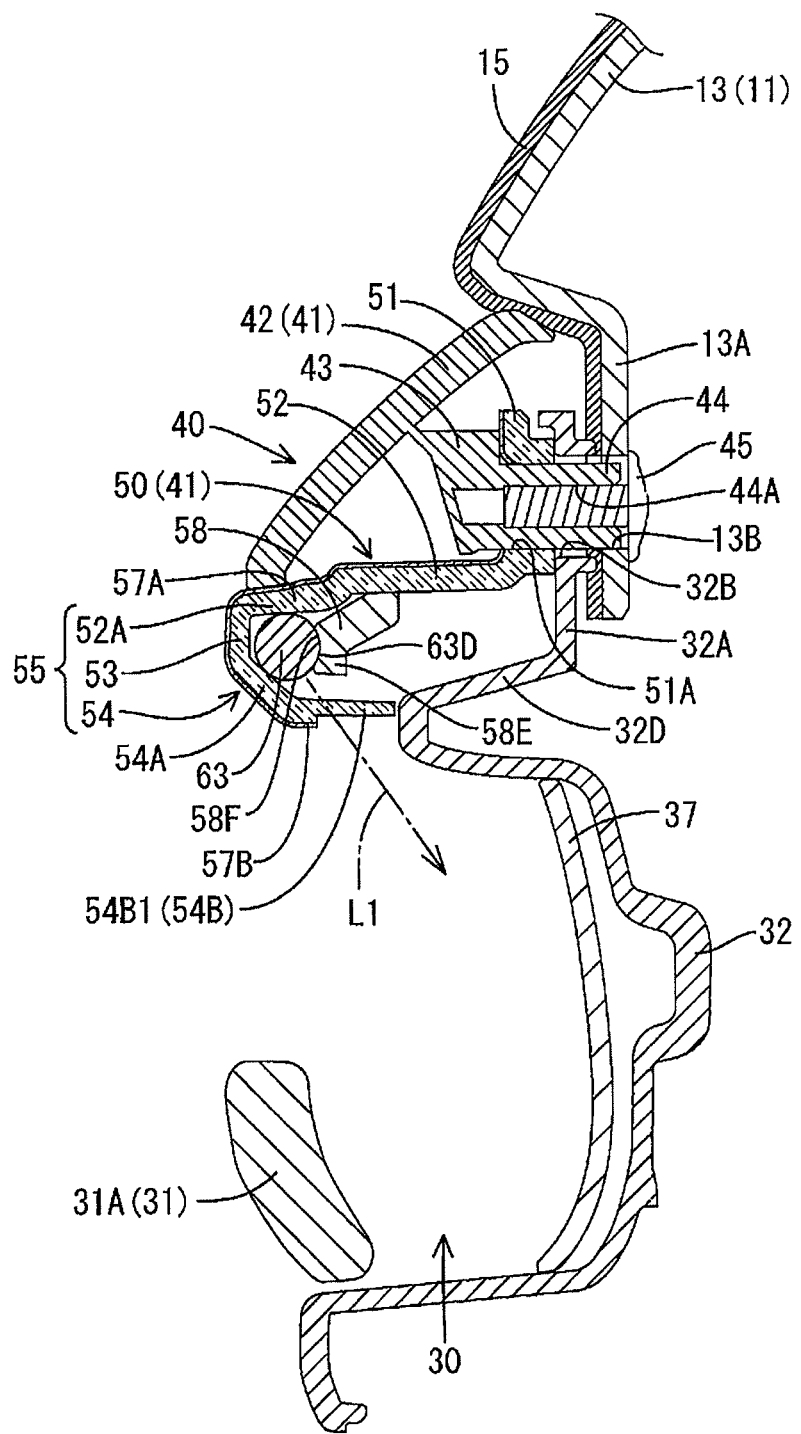
FIG. 3 is a cross-sectional view of the lighting device for a vehicle in FIG. 1 (taken along an A-A line in FIG. 1).

As illustrated in FIG. 3, the handle housing portion 30 is mainly configured with an inside handle bezel 32, an inside handle cover 37, and a decoration panel 41 (a part of the vehicular interior part) that is provided on an upper side of the inside handle bezel 32. In the following, the inside handle bezel 32 will be referred to as a bezel 32, and the inside handle cover 37 will be referred to as a cover 37.

As illustrated in FIG. 3, the bezel 32 is formed to be open toward the compartment inner side. The bezel 32 has a mounting projection (not illustrated) and is mounted to the trim board 11 via the projection. The cover 37 is provided to cover an inner wall of the bezel 32 from the compartment inner side. The cover 37 configures the inner wall of the handle housing portion 30.

The vehicular lighting device 40 of the present embodiment illuminates the handle housing portion 30 and the main body 12 (a surface to be illuminated 22 of the main body 12). The vehicular lighting device 40 includes an LED 61 (a light source), a light guide member 63 (a light exit member) that guides light emitting from the LED 61, and the decoration panel 41 (a panel member). The LED 61 and the light guide member 63 are provided on a compartment outer side of (a rear side of) the decoration panel 41.

Figure 2:
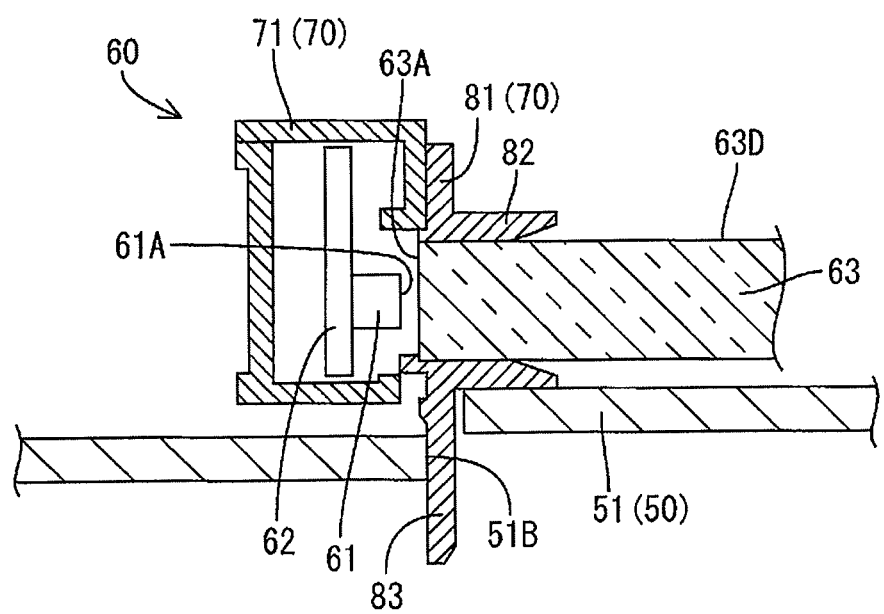
FIG. 2 is a cross-sectional view of a part of the lighting device for a vehicle in FIG. 1 that is adjacent to a light source (taken along a D-D line in FIG. 1).

As illustrated in FIG. 2, the LED 61 that is mounted on an LED board 62 is housed in a casing 70 and the casing 70 is mounted to the decoration panel 41. The LED 61 is connected to a power source (not illustrated) such as a battery that is mounted to a vehicle.

The light guide member 63 is formed to have substantially a circular cross section and configured with an elongated light guide material having flexibility and a bar-like shape. The light guide material is a material having light transmission property such as an acrylic resin and that guides light therein. The light guide materials described in Japanese Patent Unexamined Publication No. 2005-306233 and Japanese Patent Unexamined Publication No. 6-75120 may be used as the light guide material in the present embodiment.

As illustrated in FIG. 2, one end of the light guide member 63 in its longitudinal direction (an end close to a vehicle front side) is attached to the casing 70 and an end surface 63A of the one end (close to the LED 61) of the light guide member 63 faces a light emission surface 61A of the LED 61. Accordingly, the end surface 63A of the one end is a light entrance surface (a light entrance portion) that the light emitted from the LED 61 enters. In FIGS. 1 and 2, a left side corresponds to a vehicle front side and a right side corresponds to a vehicle rear side.

The casing 70 is configured with separate parts of an LED housing member 71 that houses the LED 61 and a light guide member fixing member 81 that fixes the one end of the light guide member 63. The LED housing member 71 is formed in substantially a box shape and the light guide member fixing member 81 is formed in a plate-like shape. The light guide member fixing member 81 is provided to cover a vehicle rear side surface of the LED housing member 71. The one end (the LED 61 side end) of the light guide member 63 is inserted (fitted) to a cylindrical portion 82 of the light guide member fixing member 81 and positioned with respect to the LED 61. In the present embodiment, the LED 61, the light guide member 63, and the casing 70 configure an LED unit 60.

The light guide member fixing member 81 includes a projection portion 83 that projects toward the decoration panel 41 (specifically toward a lower panel 50 that will be described later). The projection portion 83 is inserted through a through hole 51B that is formed to be through an upper end portion 51 of the lower panel 50 in a vehicle width direction. Accordingly, the casing 70 is positioned with respect to the decoration panel 41 in the vehicle front-rear direction. The casing 70 (the LED housing member 71 and the light guide fixing member 81) has a projection (not illustrated) and the projection is fitted to a mounting hole (not illustrated) formed in the lower panel 50. Accordingly, the casing 70 is fixed to the lower panel 50.

An outer peripheral surface 63D (a side surface) of the light guide member 63 is coated with fluorine resin. This accelerates the light guided through the light guide member 63 to exit outside. Total reflection of the light entering the end surface 63A of the light guide member 63 is repeated within the light guide member 63 to be guided through the light guide member 63. Then, the light exits from an entire area of the outer peripheral surface 63D. Accordingly, the whole light guide member 63 functions as a linear light source and illuminates its surroundings. Namely, the outer peripheral surface 63D of the light guide member 63 is a light exit surface (a light exit portion) from which the light entering the end surface 63A and guided into the light guide member 63 exits outside.

In the present embodiment, as illustrated in FIG. 1, the LED 61 (the casing 70) is arranged in the vehicle front side portion of the decoration panel 41. The inside handle bezel 32 (the handle housing portion 30) and the surface 22 to be illuminated in the main body 12 are arranged in the vehicle front-rear direction. The light guide member 63 extends along the extending direction of the decoration panel 41 (along the vehicle front-rear direction) so as to extend over an entire length including the handle housing portion 30 and the surface 22 to be illuminated. Accordingly, the light exiting from the light guide member 63 illuminates the handle housing portion 30 and the surface 22 to be illuminated over their entire length. The surface 22 to be illuminated is a compartment inner side surface (a light receiving portion) of the main body 12 that the light from the vehicular lighting device 40 (the light guide member 63) is illuminated.

Figure 4:
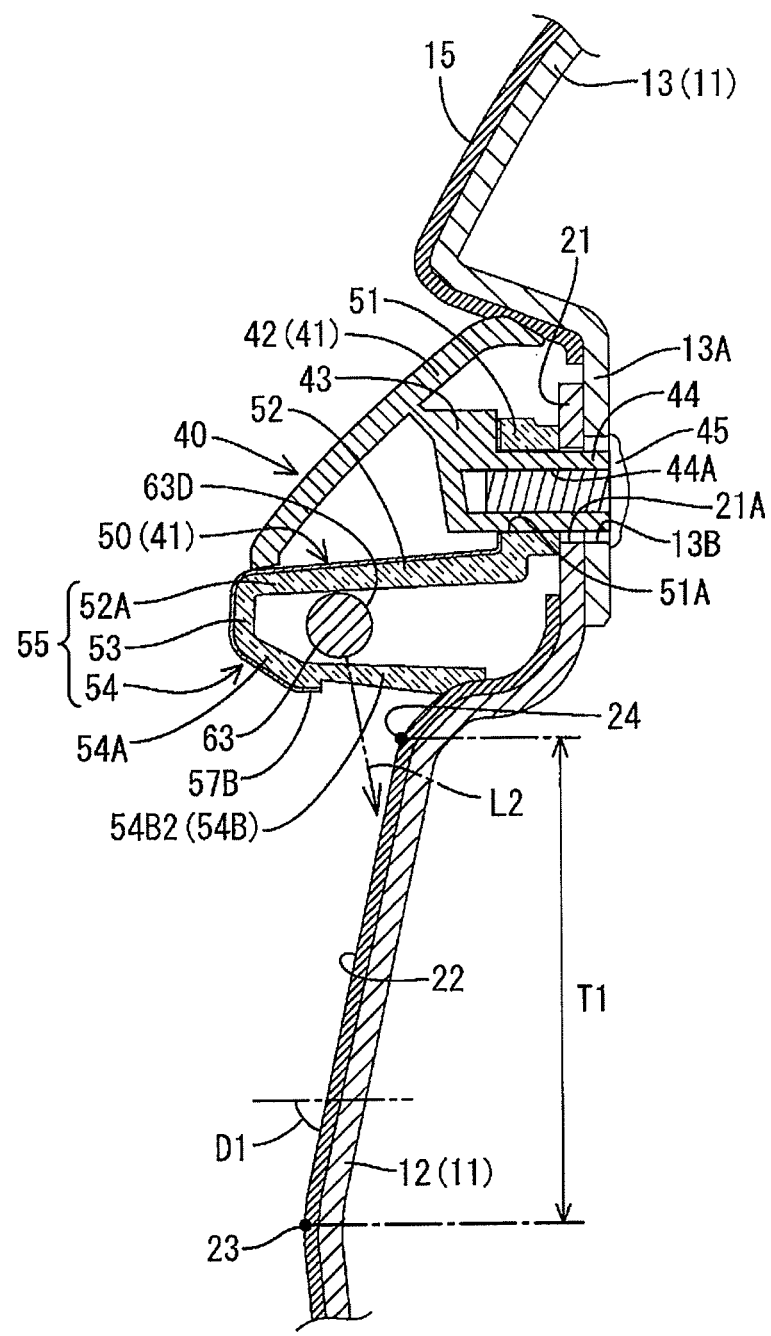
FIG. 4 is a cross-sectional view of the lighting device for a vehicle in FIG. 1 (taken along a B-B line in FIG. 1).

Next, a configuration of the decoration panel 41 will be explained. As illustrated in FIGS. 3 and 4, the decoration panel 41 is provided on an upper side of the inside handle 31 and the surface 22 of the main body 12. A lower end portion 13A of the upper board 13 is recessed (projected) toward the compartment outer side to form a step, and an upper end portion 32A of the bezel 32 is recessed (projected) toward the compartment outer side to form a step. With this configuration, the lower end portion 13A and the upper end portion 32A overlap each other to form a housing portion (a portion at which the upper board 13 and the bezel 32 are connected to each other). A part of the decoration panel 41 is housed in the housing portion.

As illustrated in FIG. 1, the decoration panel 41 extends in the vehicle front-rear direction and is configured with separate parts of an upper panel 42 and the lower panel 50. The upper panel 42 configures an upper portion of the decoration panel 41 and the lower panel 50 configures a lower portion of the decoration panel 41. As illustrated in FIG. 3, the upper panel 42 is curved and inclined to the compartment outer side (the right side in FIG. 3) as is close to the upper side. The lower panel 50 is arranged between the upper panel 42 and the bezel 32 (or the surface 22 of the main body 12).

As illustrated in FIG. 3, a flange 43 extends from a compartment outer side surface of the upper panel 42, and a cylindrical mounting boss 44 is formed to be projected from the flange 43 toward the compartment outer side. An insertion hole 13B is formed through a lower end portion 13A of the upper board 13 so as to be through in the vehicle width direction. An insertion hole 32B is formed through an upper end portion 32A of the bezel 32 so as to be through in the vehicle width direction. An insertion hole 51A is formed in the upper end portion 51 of the lower panel 50 so as to be through the vehicle width direction.

The mounting boss 44 is inserted through the insertion hole 51A, the insertion hole 43B, and the insertion hole 13B. A screw mounting hole 44A is formed in the mounting boss 44 so as to extend along a center shaft of the mounting boss 44. The screw mounting hole 44A is open to the compartment outer side. The mounting boss 44 is inserted through the insertion hole 51A, the insertion hole 32B, and the insertion hole 13B from the compartment inner side in this order, and then, the screw 45 is inserted to the screw mounting hole 44A from the compartment inner side. Accordingly, the decoration panel 41 (the upper panel 42 and the lower panel 50) is mounted to the upper board 13 and the bezel 32. The mounting bosses 44 and the insertion holes 51A, 32B, 13B are formed along the vehicle front-rear direction.

As illustrated in FIG. 4, the mounting boss 44 and the insertion holes 51A, 13B are also provided on the upper side of the surface 22 of the main body 12. An insertion hole 21A is formed in an upper end portion 21 of the main body 12. The mounting boss 44 is inserted through the insertion hole 21A.

The mounting boss 44 is inserted through the insertion hole 51A, the insertion hole 21A and the insertion hole 13B from the compartment inner side, and then, the screw 45 is inserted into the mounting boss 44 from the compartment outer side and the mounting boss 44 is fixed.

The lower panel 50 includes an upper wall portion 52, a side wall portion 53, and a lower wall portion 54. The upper wall portion 52 extends horizontally from the lower end of the upper end portion 51 toward the compartment inner side. The side wall portion 53 extends downwardly from the compartment inner side end portion of the upper wall portion 52. The lower wall portion 54 extends from the lower end portion of the side wall portion 53 toward the compartment outer side.

The distal end portion 52A (a portion of the upper wall portion 52 that is on the compartment inner side than an upper wall portion 43D of the bezel 32), the side wall portion 53 and the lower wall portion 54 of the upper wall portion 52 configure a projected wall portion 55. The projected wall portion 55 is formed to be projected to the compartment inner side than the upper wall portion 32D of the bezel 32. The projected wall portion 55 is formed to be open toward the compartment outer side and have substantially a U-shaped cross section. The projected wall portion 55 extends along the vehicle front-rear direction. The elongated light guide member 63 is housed in a space within the projected wall portion 55 (a space surrounded by the projected wall portion 55) so as to extend along the extending direction of the projected wall portion 55. Namely, the outer peripheral surface 63D (the light exit surface) of the light guide member 63 is elongated along the longitudinal direction of the lower panel 50.

Specifically, the light guide member 63 is provided on a compartment outer side surface of the projected wall portion 55 (provided at the projected end of the lower panel 50). The side wall portion 53 is provided to cover the light guide member 63 from the compartment inner side and configures a compartment inner side surface of the decoration panel 41. The lower wall portion 54 configures a lower surface of the decoration panel 41 and is provided to cover the light guide member 63 from the lower side. A portion of the lower wall portion 54 that is provided on the vehicle front side configures the handle housing portion 30 with the bezel 32.

As illustrated in FIG. 3, a light guide member fixing member 58 (a light exit member fixing member) is attached to the lower panel 50. The light guide member fixing member 58 presses the light guide member 63 from the compartment outer side and fixes it. The light guide member fixing member 58 is attached to a mounting boss (not illustrated) that is provided on an upper end portion of the lower panel 50.

The light guide member fixing member 58 is formed in substantially a plate shape and an end portion of the light guide member fixing member 58 close to the compartment inner side is a contact portion 58E that is in contact with the light guide member 63. The light guide member fixing member 58 (the contact portion 58E) extends along a longitudinal direction of the light guide member 63 (in the vehicle front-rear direction), and presses an entire length of the light guide member 63 from the compartment outer side.

A recess 58F is formed on a surface of the contact portion 58E that faces the light guide member 63. The recess 58F is recessed to correspond to an outer peripheral surface 63D of the light guide member 63. A part of the light guide member 63 is fitted to the recess 58F and this surely fixes the light guide member 63. As is explained above, according to the present embodiment, the decoration panel 41 (the upper panel 42 and the lower panel 50), the light guide member 63, and the light guide member fixing member 58 are integrally assembled and configured as a unit.

The lower wall portion 54 of the lower panel 50 includes an inclined portion 54A and a light transmission portion 54B. The inclined portion 54A is inclined such that an end portion extends downwardly to be close to the compartment outer side. The light transmission portion 54B extends substantially horizontally from the compartment outer side end of the inclined portion 54A (a lower end of the inclined portion 54A). The light exiting from the light guide member 63 passes through the light transmission portion 54B toward the handle housing portion 30 and the surface 22 of the main body 12. The light transmission portion 54B is provided on the wall portion (the lower wall portion 54) of the projected wall portion 55 that faces the inside handle 31 (or the surface 22 of the main body 12).

In the present embodiment, the lower panel 50 is configured with a base member 57A and a light blocking layer 57B. The base member 57A is made of a synthetic resin material having high light transmission or high transparency such as acrylic or polycarbonate. The light blocking layer 57B covers a surface of the base member 57A that faces the compartment inner side. No light blocking layer 57B is formed on the light transmission portion 54B, and the base member 57A corresponding to the light transmission portion 54B does not include the light blocking layer 57B. Accordingly, the light transmits through the light transmission portion 54B towards the handle housing portion 30 (and the surface 22 of the main body 12). Namely, at least a part of the compartment outer side end portion of the decoration panel 41 is formed of a material having high light transmission and forms the light transmission portion 54B. The light transmission portion 54B is integrally formed with the lower panel 50.

The light blocking layer 57B is formed by coating the surface of the base member 57A with a material having a light blocking property or adhering a film having a light blocking property to the surface of the base member 57A. The light blocking layer 57B may be formed by coating with plating and this improves design. However, examples of the light blocking layer 57B is not limited thereto and the light blocking layer 57B may be formed with any other methods as long as it has a light blocking property.

As illustrated in FIG. 3, the light guide member 63 is provided in the lower panel 50 and provided on the compartment inner side than the light transmission portion 54B in the vicinity of the handle housing portion 30. The light guide member 63 and the inside handle 31 are provided so as not to be shifted from each other in a vehicular compartment inner-outer direction (a left-right direction in FIGS. 3 and 4).

The light transmission portion 54B is formed to extend along the front-rear direction of a vehicle. The light transmission portion 54B is provided on the upper side of the handle housing portion 30 and the surface 22 of the main body 12 and extends over an entire length of the handle housing portion 30 and the surface 22 of the main body 12. With this configuration, the linear light that is exited from the light guide member 63 and passes through the light transmission portion 54B can illuminate an entire length of the inside handle housing portion 30 and the surface 22 of the main body 12.

Figure 5:
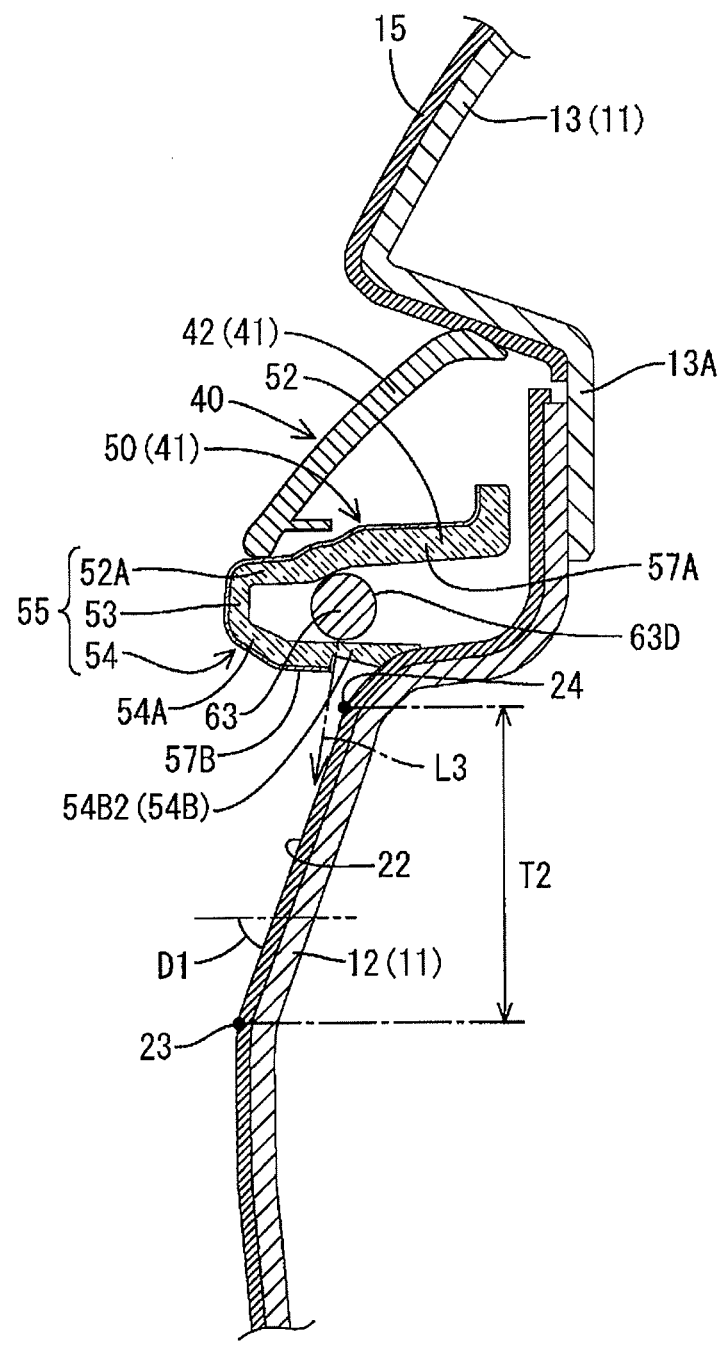
FIG. 5 is a cross-sectional view of the lighting device for a vehicle in FIG. 1 (taken along a C-C line in FIG. 1).

The light transmission portion 54B includes a first light transmission portion 54B1 and a second light transmission portion 54B2. The light exiting from the light guide member 63 (the outer peripheral surface 63D) passes through the first light transmission portion 54B1 to the handle housing portion 30 (first portion to be illuminated). The light exiting from the light guide member 63 passes through the second light transmission portion 54B2 to the surface 22 of the main body 12 (a second portion to be illuminated). In FIGS. 1 and 3 to 5, the light exiting from the light guide member 63 and passing through the first light transmission portion 54B1 to the handle housing portion 30 is illustrated by a light ray L1 and the light exiting from the light guide member 63 and passing through the second light transmission portion 54B2 to the surface 22 is illustrated by a light ray L2 and a light ray L3. FIG. 4 is a cross-sectional view of the vehicle front side portion of the surface 22 (taken along a B-B line in FIG. 1), and FIG. 5 is a cross-sectional view of the vehicle rear side portion of the surface 22 (taken along a C-C line in FIG. 1).

In the present embodiment, as illustrated in FIG. 1, the LED 61 (the casing 70), the handle housing portion 30, and the surface 22 of the main body 12 are provided in this order from the vehicle front side. Therefore, the second light transmission portion 54B2 is arranged farther away from the LED 61 than the first light transmission portion 54B1 in the vehicle front-rear direction (in the longitudinal direction of the outer peripheral surface 63D of the light guide member 63).

Figure 6:
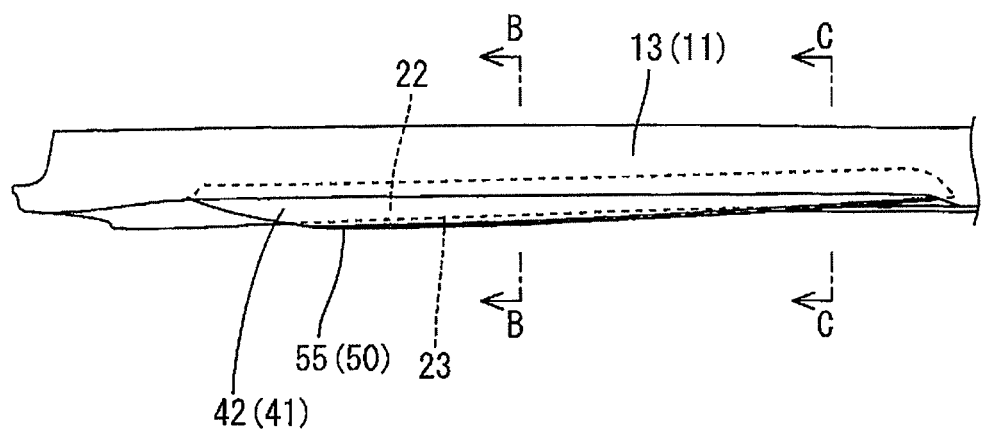
FIG. 6 is a plan view illustrating an upper board and a decoration panel.

As illustrated in a plan view seen from the above as is in FIG. 6, the projected wall portion 55 (the decoration panel 41) is formed such that a projected end (a lower end portion in FIG. 6) is projected further to the compartment inner side than the lower end top 23 of the surface 22. A projection amount of the decoration panel 41 in the compartment inner-outer direction decreases as is closer to the vehicle rear side (the right side in FIG. 6) or as is farther away from the light source. Namely, the projected wall portion 55 extends such that a projected end portion is inclined toward the compartment outer side and becomes closer to the surface 22 as is farther away from the LED 61.

The light guide member 63 is formed to be curved or inclined to be closer to the compartment outer side and also closer to the surface 22 along the extending direction of the projected wall portion 55 as is farther away from the LED 61. Accordingly, the light guide member 63 and the surface 22 become closer to each other in the compartment inner-outer direction as they are farther away from the LED 61 (as are closer to the vehicle rear side), as illustrated in FIGS. 4 and 5. Namely, a minimum distance between the light guide member 63 and the surface 22 becomes shorter as is farther away from the LED 61.

As illustrated in FIG. 4, the second light transmission portion 54B2 is provided to cover the light guide member 63 from the lower side. As illustrated in FIGS. 4 and 5, the surface 22 of the main body 12 is located below the light guide member 63 (the light transmission portion 54B) and is an inclined surface that is inclined toward the compartment inner side as is closer to the lower side. The surface 22 is inclined with respect to the horizontal direction at an inclination angle (D1, D2 in FIGS. 4 and 5) and the inclination angle decreases as is farther away from the LED 61. Namely, the inclination angle D2 in FIG. 5 is smaller than the inclination angle D1 in FIG. 4.

As illustrated in FIG. 1, the surface 22 is formed in a rectangular shape extending along the vehicle front-rear direction and the lower end edge 23 is sloped upwardly (toward the light guide member 63) as is farther away from the LED 61. An upper end edge 24 of the surface 22 (an upper end of the second portion to be illuminated) extends straight at a constant height along the vehicle front-rear direction (the extending direction of the surface 22).

The surface 22 area is formed such that a length thereof in an upper-lower direction decreases as is closer to the vehicle rear side. In FIG. 4, the length of the surface 22 in the upper-lower direction (a distance between the upper end edge 24 and the lower end edge 23) is represented by T1. In FIG. 5, the length of the surface 22 in the upper-lower direction is represented by T2 and the length T2 is smaller than the length T1.

Next, advantageous effects of the present embodiment will be explained. In the present embodiment, the light exiting from the light guide member 63 illuminates the handle housing portion 30 and the surface 22 of the main body 12. Accordingly, inside of the handle housing portion 30 can be easily seen and the design of the surface 22 is improved. In the present embodiment, the light guide member 63 and the surface 22 get closer to each other in the compartment inner-outer direction as they are farther away from the LED 61. Therefore, the portion of the surface 22 that is far from the LED 61 (for example, the portion illustrated in FIG. 5) is illuminated by brighter light than the portion of the surface 22 that is close to the LED 61 (for example, the portion illustrated in FIG. 4).

Generally, the light exiting from the light guide member 63 becomes darker (the brightness becomes lower) as is farther away from the LED 61. Therefore, in the configuration that the LED 61, the handle housing portion 30 and the surface 22 are arranged in this order like the present embodiment, the brightness of light reaching the respective portion generally changes as follows. The brightness of light reaching the handle housing portion 30 is highest, and the brightness of light reaching the surface 22 far from the LED 61 is lowest, and the brightness of light reaching the surface 22 close to the LED 61 is middle.

In the present embodiment, the brightness of light reaching the handle housing portion 30 and the portion of the surface 22 far from the LED 61 can be greater than the brightness of light reaching the portion of the surface 22 that is close to the LED 61. The effects obtained by the configuration in which one light source is arranged for each of the handle housing portion 30 and the portion of the surface 22 far from the LED 61 (the configuration having two light sources) can be obtained by the configuration having only one light source (the LED 61). This achieves the lighting device 40 for a vehicle having improved design with a simple configuration.

In the present embodiment, the decoration panel 41 has the projected wall portion 55 that projects toward the compartment inner side. The projected wall portion 55 extends along the longitudinal direction of the light guide member 63 and is projected such that the projected end portion is inclined toward the compartment outer side and also becomes closer to the surface 22 as is farther away from the LED 61. The light guide member 63 is arranged on the compartment outer side of the projected wall portion 55. The light guide member 63 extends along the extending direction of the projected wall portion 55 and is curved and inclined to be closer to the compartment outer side and also closer to the surface 22 as is farther away from the LED 61.

The light guide member 63 is curved and inclined to be closer to the compartment outer side and the surface 22 as is farther away from the LED 61. With this configuration, the light guide member 63 and the surface 22 become closer to each other in the compartment inner-outer direction as they are farther away from the LED 61. The projected wall portion 55 extends such that the projected end portion is inclined toward the compartment outer side and to be closer to the surface 22 as is farther away from the LED 61. With this configuration, the light guide member 63 is arranged along the extending direction of the projected wall portion 55 (along the curved shape) and the light guide member 63 is easily curved.

The surface 22 is located below the light guide member 63 and is an inclined surface that is inclined toward the compartment inner side as is closer to the lower side. The surface 22 is inclined with respect to the horizontal direction at the inclination angle and the inclination angle decreases as is farther away from the LED 61.

In the present embodiment, the inclination angle of the surface 22 with respect to the horizontal direction decreases as is farther away from the LED 61. In the configuration of the present embodiment in which the surface 22 is inclined toward the compartment inner side as is closer to the lower side, the light exiting from the light guide member 63 and reflecting off the surface 22 toward the compartment inner side is likely to be directed upward as the inclination angle with respect to the horizontal direction is smaller (closer to be horizontal). As a result, if passenger's eyes are located on an upper side from the surface 22, the light reflecting off the portion of the surface 22 that is far from the LED 61 is likely to reach the passenger's eyes. Accordingly, the passenger can see the portion of the surface far from the LED 61 with higher brightness.

In the present embodiment, the upper end 24 of the surface 22 extends straight at a constant height along the vehicle front-rear direction (the extending direction of the surface 22). The lower end edge 23 of the surface 22 is sloped to be closer to the light guide member 63 as is farther away from the LED 61. Namely, the length of the surface 22 ranging in the upper-lower direction decreases as is farther away from the LED 61.

With this configuration, the passenger can see the portion of the surface 22 far from the LED 61 (having a smaller length in the upper-lower direction) with brighter light than the portion of the surface 22 close to the LED 61 (having a smaller length in the upper-lower direction). The portion of the surface 22 that is far from the LED 61 can be illuminated by bright light.

Other Embodiments

The present invention is not limited to the embodiments as described above with reference to the drawings. For example, the present invention may include following embodiments.

(1) In the above embodiment, the vehicular door trim 10 is an example of the vehicular interior part to which the vehicular lighting device 40 is mounted. However, it is not limited thereto. For example, a quarter trim or a deck side trim may be an example of the vehicular interior part.

(2) The panel member is not necessarily the decoration panel 41. For example, the upper board 13 may used as the panel member.

(3) In the above embodiment, the handle housing portion 30 is an example of the first portion to be illuminated, and the surface 22 of the main body 12 is an example of the second portion to be illuminated. However, it is not limited thereto. Any part that can be mounted to the vehicular interior part is used as the first portion to be illuminated and the second portion to be illuminated and a switch base or a door pocket may be an example thereof.

(4) In the above embodiment, the LED 61 is used as the light source. However, it is not limited thereto. For example, various kinds of light sources such as a filament lamp (bulb), a fluorescent tube, and a halogen lamp may be used as the light source.

(5) In the above embodiment, a part of the decoration panel 41 (the lower panel 50) has a high light transmission property to be the light transmission portion 54B (the first light transmission portion 54B1 and the second light transmission portion 54B2). However, the configuration is not limited thereto. The light transmission portion 54B may have any configuration as long as the light exiting from the light guide member 63 can pass therethrough to the handle housing portion 30 and the surface 22 of the main body 12. For example, a through hole may be formed in the lower panel 50 through which the light passes and used as the light transmission portion.

EXPLANATION OF SYMBOLS

10: Vehicular door trim (Vehicular interior part), 22: Surface to be illuminated (Second portion to be illuminated), 23: Lower end of the surface to be illuminated (Lower end of the second portion to be illuminated), 24: Upper end of the surface to be illuminated (Upper end of the second portion to be illuminated), 30: Handle housing portion (First portion to be illuminated), 40: Lighting device for a vehicle, 41: Decoration panel (Panel member), 54B1: First light transmission portion, 54B2: Second light transmission portion, 55: Projected wall portion, 61: LED (Light source), 63: Light guide member, 63A: End surface of the light guide member (Light entrance portion), 63D: Outer peripheral surface of the light guide member (Light exit portion), D1, D2: Inclination angle of the second portion to be illuminated with respect to horizontal direction

What is claimed is:

1. A lighting device for a vehicle provided to a vehicular interior part to illuminate a first portion and a second portion of the vehicular interior part that are to be illuminated, the lighting device comprising:
   a light source;
   a panel member formed in an elongated shape and configuring a part of the vehicular interior part;
   a light guide member formed in an elongated shape and provided to the panel member and including a light entrance portion and a light exit portion, the light entrance portion being where light from the light source enters and the light exit portion extending in a longitudinal direction of the panel member and from where the light entering the light entrance portion exits;
   a first light transmission portion provided in the panel member and through which the light exiting from the light exit portion transmits toward the first portion to be illuminated; and
   a second light transmission portion provided in the panel member farther away from the light source than the first light transmission portion and through which the light exiting from the light exit portion transmits toward the second portion to be illuminated, the second light transmission portion and the second portion extending along a longitudinal direction of the light exit portion, wherein
   a distance between the light guide member and the second portion decreases as the light guide member and the second portion extend away from the light source along the longitudinal direction of the panel member,
   the second portion is provided on a lower side of the panel member relative to the light guide member and is an inclined surface that is inclined to be closer to a vehicular compartment inner side as the second portion extends closer to a lower side of the vehicle interior part, and
   the inclined surface of the second portion is inclined at an inclination angle with respect to a horizontal direction, and the inclination angle decreases as the second portion extends farther away from the light source along the longitudinal direction of the light guide member.

2. A lighting device for a vehicle provided to a vehicular interior part to illuminate a first portion and a second portion of the vehicular interior part that are to be illuminated, the lighting device comprising:

a light source;

a panel member formed in an elongated shape and configuring a part of the vehicular interior part;

a light guide member formed in an elongated shape and provided to the panel member and including a light entrance portion and a light exit portion, the light entrance portion being where light from the light source enters and the light exit portion extending in a longitudinal direction of the panel member and from where the light entering the light entrance portion exits;

a first light transmission portion provided in the panel member and through which the light exiting from the light exit portion transmits toward the first portion to be illuminated; and a second light transmission portion provided in the panel member farther away from the light source than the first light transmission portion and through which the light exiting from the light exit portion transmits toward the second portion to be illuminated, the second light transmission portion and the second portion extending along a longitudinal direction of the light exit portion, wherein a distance between the light guide member and the second portion decreases as the light guide member and the second portion extend away from the light source along the longitudinal direction of the panel member, the second portion to be illuminated is provided on a lower side of the panel member relative to the light guide member and is an inclined surface that is inclined to be closer to a vehicular compartment inner side as the second portion extends closer to a lower side of the vehicle interior part, the second portion has an upper edge that is at a constant height along the extending direction of the second portion, and the second portion has a lower edge that is sloped to be closer to the light guide member as the second portion extends farther away from the light source along the longitudinal direction of the light guide member.

3. The lighting device according to claim 1, wherein
the second portion has an upper edge that is at a constant height along the extending direction of the second portion, and
the second portion has a lower edge that is sloped to be closer to the light guide member as the second portion extends farther away from the light source along the longitudinal direction of the light guide member.

4. The lighting device according to claim 1, wherein as the light guide member extends father away from the light source, the light guide member is curved such that a distance between the light guide member and the vehicular compartment outer side is decreased.

5. The lighting device according to claim 1, wherein the panel member has a light transparency property.

6. The lighting device according to claim 2, wherein as the light guide member extends father away from the light source, the light guide member is curved such that a distance between the light guide member and the vehicular compartment outer side is decreased.

7. The lighting device according to claim 2, wherein the panel member has a light transparency property.

8. The lighting device according to claim 1, wherein
the panel member has a projected wall portion projecting to a vehicular compartment inner side, the projected wall portion extends along the longitudinal direction of the light guide member and is projected such that a projected end is inclined toward a vehicular compartment outer side as the projected end extends farther away from the light source along the longitudinal direction of the light guide member, and
the light guide member is provided on the vehicular compartment outer side relative to the projected wall portion, and the light guide member extends along an extending direction of the projected wall portion so as to be closer to the vehicular compartment outer side as the light guide member extends farther away from the light source.

9. The lighting device according to claim 2, wherein
the panel member has a projected wall portion projecting to a vehicular compartment inner side, the projected wall portion extends along the longitudinal direction of the light guide member and is projected such that a projected end is inclined toward a vehicular compartment outer side as the projected end extends farther away from the light source along the longitudinal direction of the light guide member, and
the light guide member is provided on the vehicular compartment outer side relative to the projected wall portion, and the light guide member extends along an extending direction of the projected wall portion so as to be closer to the vehicular compartment outer side as the light guide member extends farther away from the light source.

10. The lighting device according to claim 8, wherein
the second portion has an upper edge that is at a constant height along the extending direction of the second portion, and
the second portion has a lower edge that is sloped to be closer to the light guide member as the second portion extends farther away from the light source along the longitudinal direction of the light guide member.

11. The lighting device according to claim 9, wherein
the inclined surface of the second portion is inclined at an inclination angle with respect to a horizontal direction, and the inclination angle decreases as the second portion extends farther away from the light source along the longitudinal direction of the light guide member.

* * * * *